(12) United States Patent
Reichelt (10) Patent No.: US 12,076,779 B2
(45) Date of Patent: Sep. 3, 2024

(54) METHOD AND SYSTEM THAT PRODUCES FORMED PARTS BY A MULTI-STAGE PRESS

(71) Applicant: WAFIOS Umformtechnik GmbH, Wuppertal (DE)

(72) Inventor: Christoph Reichelt, Wuppertal (DE)

(73) Assignee: WAFIOS Umformtechnik GmbH, Wuppertal (DE)

( * ) Notice: Subject to any disclaimer, the term of this patent is extended or adjusted under 35 U.S.C. 154(b) by 87 days.

(21) Appl. No.: 17/888,803

(22) Filed: Aug. 16, 2022

(65) Prior Publication Data

US 2023/0058861 A1  Feb. 23, 2023

(30) Foreign Application Priority Data

Aug. 19, 2021 (DE) .......................... 102021209143.1

(51) Int. Cl.
  *B21J 9/02*  (2006.01)
  *B21J 13/03*  (2006.01)
  (Continued)

(52) U.S. Cl.
  CPC .............. *B21J 9/022* (2013.01); *B21J 13/03* (2013.01); *B21K 1/466* (2013.01); *B23P 19/005* (2013.01); *B65G 51/02* (2013.01); *B65G 2812/16* (2013.01)

(58) Field of Classification Search
  CPC .... B65G 51/02; B65G 2812/16; B21K 1/466; B21K 27/02; B21K 27/04; B21K 27/06;
  (Continued)

(56) References Cited

U.S. PATENT DOCUMENTS 2,026,823 A * 1/1936 Clouse ..................... B21J 13/08
  470/139
2,815,519 A * 12/1957 Friedman ............... B21K 27/00
  72/428

(Continued)

FOREIGN PATENT DOCUMENTS

CN  103708227 A  4/2014
DE  195 35 264 A1  3/1997
(Continued)

OTHER PUBLICATIONS

EP 0753364 A1, Mielke et al. Jan. 1997.*
(Continued)

*Primary Examiner* — Edward T Tolan
(74) *Attorney, Agent, or Firm* — DLA Piper LLP (US)

(57) ABSTRACT

A method of producing shaped parts includes drawing in the wire in cycles conveying the wire; severing wire portions in cycles; gripping and feeding the wire portion into work area; shaping the wire portion in multiple stages to form a shaped part with shank and head portions; ejecting formed shaped parts in cycles; transporting the fully formed shaped parts with a pneumatic conveyor system including a transporting pipe with an insertion opening: arranging the insertion opening near an ejector system such that the finished shaped parts can be inserted into the insertion opening directly in a positionally oriented manner by the ejector system; successively feeding the finished shaped parts into the transporting pipe by the ejector system; taking up the shaped parts inserted into the transporting pipe by suction into the transporting pipe; and pneumatically transporting the shaped parts through the transporting pipe in a direction of a subsequent station.

13 Claims, 5 Drawing Sheets

(51) Int. Cl.
    *B21K 1/46*     (2006.01)
    *B23P 19/00*     (2006.01)
    *B65G 51/02*     (2006.01)

(58) Field of Classification Search
    CPC .. B21J 9/022; B21J 13/03; B21J 13/14; B23P 19/005
    See application file for complete search history.

(56) References Cited

U.S. PATENT DOCUMENTS

| | | | | |
|---|---|---|---|---|
| 3,311,262 | A | * | 3/1967 | MacDonald .......... B23P 19/003 470/167 |
| 4,178,662 | A | * | 12/1979 | Borodin ................ B65G 51/16 406/84 |
| 5,081,732 | A | | 1/1992 | Steinhilber |
| 7,513,181 | B2 | * | 4/2009 | Berns ...................... B23Q 7/00 82/126 |
| 9,309,063 | B2 | * | 4/2016 | Soerensen ............... B65G 51/02 |
| 9,421,613 | B2 | * | 8/2016 | Almasi ................... B23B 13/12 |
| 2023/0114519 | A1 | * | 4/2023 | Walz ...................... B65G 51/02 72/135 |

FOREIGN PATENT DOCUMENTS

| | | |
|---|---|---|
| DE | 103 32 655 A1 | 2/2005 |
| DE | 10 2017 207 585 A1 | 11/2018 |
| JP | S62-259634 A | 11/1987 |
| JP | 2016-221535 A | 12/2016 |

OTHER PUBLICATIONS

CH 626277 A5, Koch Nov. 1981.*
DE 102016107125 A1, Hofmann et al. Oct. 2017.*
KR 20180000051A, Oh Jan. 2018.*
DE 3907260 A1, Enderlin Sep. 1989.*
Extended European Search Report dated Jan. 17, 2023, of counterpart European Patent Application No. 22190348.7, along with an English machine translation.

* cited by examiner

METHOD AND SYSTEM THAT PRODUCES FORMED PARTS BY A MULTI-STAGE PRESS

TECHNICAL FIELD

This disclosure relates to a method and a system that produces shaped parts from wire by a multi-stage press, in particular that produces screws, rivets or other shaped parts from wire portions.

BACKGROUND

For the efficient and highly precise production of fastening elements such as, e.g., screws, nails, rivets from metallic wire, nowadays use is predominantly made of wire shaping machines that operate with cold or preheated wires. Wire shaping machines are machine tools that can create smaller or larger series of shaped parts from wire in an automatic manufacturing process with the aid of suitable tools, predominantly by shaping.

A multi-stage press of the type herein comprises a drawing-in system for drawing in wire from a wire supply in cycles and conveying the wire to a cutting system, a cutting system for severing wire portions from the fed wire in cycles, and a feeder system for gripping a respective severed wire portion in time with the machine cycles and feeding the wire portion into the work area of the shaping tools. Multiple (i.e., two or more) shaping stations with shaping tools for the multi-stage shaping of the wire portion are accommodated in the shaping area. Multiple shaping operations are carried out one after another to create a shaped part having a shank portion and a head portion that is widened with respect to the shank portion from the initially usually cylindrical wire portion of specified length by multi-stage pressing. The fully pressed shaped parts are then ejected in cycles, part by part, with the aid of an ejector system of the shaping press.

In double-pressure presses, the shaping operations comprise precisely one pre-compression operation and precisely one downstream finishing compression operation. In other multi-stage presses, three or more shaping stations for three, four or more shaping operations can be provided.

Some shaped parts are formed ready for use after leaving the shaping press since the shape that comes out of the shaping press corresponds to the shape intended for use. They can thus be made ready for shipment. In other manufacturing processes, subsequent processing operations (one or more) follow. During the manufacture of some screws, the shaped parts are transported to a rolling machine after this, for example, to form the thread in the shank portion.

The ejected shaped parts must be transported out of the area of the shaping machine. To that end, a transporting device, which has a conveyor belt or a slide and collects the ejected shaped parts that have dropped down and transports them away from the shaping machine, is generally provided underneath the shaping area or underneath the ejector system. If screws are to be manufactured, the blanks coming out of the shaping press are then, e.g., collected in containers, transported to a washing installation via stackers, freed of any possible adhering machine oil so that it is not lost in subsequent processes, and there transported to the rolling machine by stackers to create the thread. Pressed parts can also become jammed or damaged during transport, this possibly leading to products intermingling or problems in subsequent processing operations later on.

It could therefore be helpful to provide a method and a system that produces shaped parts from wire such as, e.g., screws, rivets, nails or the like by a multi-stage press, which in comparison with conventional methods and systems make it possible to produce high-quality shaped parts cost-effectively and with resource saving together with a high output rate.

SUMMARY

I provide a method of producing shaped parts from wire by a multi-stage press that produces shaped parts from wire portions, comprising:
  drawing in the wire from a wire supply in cycles and conveying the wire to a cutting system;
  severing wire portions from the fed wire in cycles by the cutting system;
  gripping a respective severed wire portion and feeding the wire portion into the work area of shaping tools;
  shaping the wire portion in multiple stages to form a shaped part with a shank portion and a head portion widened with respect to the shank portion by the shaping tools;
  ejecting the fully formed shaped parts in cycles by an ejector system;
  transporting the fully formed shaped parts with a pneumatic conveyor system comprising a transporting pipe with an insertion opening for successively receiving finished shaped parts by:
  arranging the insertion opening in the vicinity of the ejector system such that the finished shaped parts can be inserted into the insertion opening directly in a positionally oriented manner by the ejector system;
  successively feeding the finished shaped parts into the transporting pipe by the ejector system during the manufacturing operation;
  taking up the shaped parts inserted into the transporting pipe by suction into the transporting pipe; and
  pneumatically transporting the sucked-on shaped parts through the transporting pipe in a direction of a subsequent station.

I also provide a system that produces shaped parts from wire that produces shaped parts from wire portions, having at least one multi-stage press comprising:
  a drawing-in system that draws in wire from a wire supply in cycles and conveys the wire to a cutting system;
  a cutting system that severs wire portions from the fed wire in cycles;
  a feeder system that grips a respective severed wire portion and feeds the wire portion into the work area of shaping tools of the wire shaping machine;
  multiple shaping stations with shaping tools that shape the wire portion in multiple stages to form a shaped part with a shank portion and a head portion that is widened with respect to the shank portion;
  an ejector system that ejects the fully formed shaped parts in cycles, comprising:
  a pneumatic conveyor system that transports finished shaped parts out of the work area comprising a transporting pipe with an insertion opening that successively receives finished shaped parts;
  the insertion opening is arranged in the vicinity of the ejector system such that the finished shaped parts can be inserted into the insertion opening directly in a positionally oriented manner by the ejector system;
  the ejector system is configured, during the manufacturing operation, to insert finished shaped parts for take-up by the conveyor system at least partially into the transporting pipe through the insertion opening in cycles; and the conveyor system is configured to suck up the shaped part taken up by the ejector system in the region of the inlet opening and pneumatically convey it through the transporting pipe in the direction of a subsequent station.

DETAILED DESCRIPTION

I provide a pneumatic conveyor system for transporting away finished shaped parts in a controlled manner. The conveyor system comprises a transporting pipe that has an insertion opening for successively receiving finished shaped parts. In the fully installed conveyor system, the insertion opening of the transporting pipe is arranged in the vicinity of the ejector system such that the finished shaped parts can be inserted into the insertion opening up to at least part of their length directly and in a positionally oriented manner by the ejector system. During the productive manufacturing operation, the finished shaped parts are then successively inserted into the transporting pipe in cycles with the aid of the ejector system. "Positionally oriented" means that the shaped parts are not provided in an uncontrolled manner in any orientations, but are fed or transferred for take-up to the transporting pipe with a defined orientation in the transfer area. In this respect, the longitudinal direction of the shaped parts is oriented substantially parallel to the longitudinal direction of the transporting pipe.

The shaped parts inserted into the transporting pipe at least up to part of their length are taken up into the transporting pipe by suction and then pneumatically transported away through the transporting pipe in the direction of at least one subsequent station. The insertion opening thus also acts as an intake opening. The conveyor system and the ejector system of the shaping machine are thus adapted to one another to interact during a transfer. The ejector system is configured, during the productive operation, to insert shaped parts for take-up by the conveyor system at least partially into the transporting pipe through the insertion opening in cycles. The conveyor system is configured to suck up or suck in the shaped part taken up by the ejector system in the region of the insertion opening and pneumatically convey it through the transporting pipe in the direction of a subsequent station.

"Transporting pipe" means both intrinsically rigid, tubular transporting devices and flexible transporting pipes such as, for example, flexible hoses. The transporting pipe cross section that is operative in transport terms is preferably circular (cylindrical pipe) but cross-sectional shapes that differ from the circular shape are also possible, e.g., polygonal cross-sectional shapes such as, e.g., in rectangular pipes or hexagonal pipes. A transporting pipe may have multiple pipe portions with different shapes, e.g., straight portions and curved portions as viewed in a longitudinal direction or transporting direction.

Pneumatic conveyor systems, that is to say conveyor systems operating on pneumatics, function by negative and positive pressure of a gaseous delivery fluid. Air is generally used as the fluid delivery medium. Such systems are used, for example, in the foodstuff, pharmaceutical, chemical and plastics sectors. In those regions of a transport section in which the transport is effected by positive pressure, the product to be transported is blown through the pipeline. When work is carried out at negative pressure, the product to be transported is sucked through the pipeline.

As a departure from these usual fields of use, I use a pneumatic conveyor system in special manufacturing technology instances involving pressed parts created by multi-stage pressing to alleviate or avoid specific problems identified in such instances.

A configuration is made such that a negative pressure prevails compared to the ambient pressure in the region of the insertion opening of the transporting pipe, that is to say at the pipe inlet side, during operation, with the result that the shaped parts transferred in a controlled manner by the ejector system are actively taken up into the transporting pipe by negative pressure, that is to say by suction, when they have reached a suitable depth in the transporting pipe.

This concept has considerable advantages, specifically in conjunction with shaping machines working with a high production output. Owing to the direct transfer from the ejector to the transporting tube, the pressed parts may be transported out of the shaping machine substantially free of oil since they no longer come into contact with oil after leaving the ejector. It is therefore possible to dispense with washing the pressed parts for any subsequent processing. Owing to the positionally oriented transfer in time with the shaping machine cycles, damage to or intermingling of pressed parts can be systematically ruled out. The pressed parts are fed to the (at least one) subsequent station in their manufacturing sequence. With the aid of a pneumatic conveyor system, it is possible to transport pressed parts cost-effectively even over greater distances. This provides great flexibility in the design of larger manufacturing installations with incorporation of shaping presses of the type under consideration here. The individual components of inter-linked installations can be positioned more flexibly than before.

By virtue of minimizing the loss of machine oil and correspondingly cleaner machine surroundings, it is possible to save on resources and costs. Savings on resources and costs are also produced by dispensing with conveyor belts, oil tanks, leakage oil pumps and control means therefor. Further contributions to saving on resources and costs result from reducing transport routes and reducing the space requirement. In addition, the resulting suction in the work area as a result of the extraction by suction can promote cooling of the tools and therefore increase their service life.

A system suitable for carrying out the method comprises at least one multi-stage press and an associated pneumatic conveyor system.

According to one example, the ejector system has an ejector pin that can be moved back and forth in time with the machine cycles, which ejector pin displaces fully pressed shaped parts respectively out of a die arranged in the ejector station or out of a gripper in the direction of the transporting pipe, wherein the insertion opening is mounted close to the ejector system such that the finished shaped parts are pushed directly into the insertion opening with the aid of the ejector pin. The ejector pin is preferably in touching contact with the shank-side end of the shaped part at least until at least the head portion has been pushed completely into the interior of the transporting pipe. It is therefore possible to ensure a fully controlled, positionally oriented transfer.

According to one example, use is made of a transporting pipe adapted to the dimensions of the shaped part, that is to say adapted to the workpiece. The following design criteria may be met individually or in combination.

The transporting pipe preferably has an inside diameter that is smaller than a length of the shaped parts. This makes it possible to easily prevent the pressed parts from becoming reoriented and/or overtaking one another within the transporting pipe during the transport. The positional orientation thus continues as the parts move via the transport section.

As an alternative or in addition, use is made of a workpiece-adapted transporting pipe having an inside diameter slightly larger than an outside diameter of the head portion, wherein the inside diameter is preferably at most 20% larger, in particular at most 10% larger, than the outside diameter of the head portion. In head portions that have not a circular cross section but a polygonal cross section, the term outside diameter relates to the largest outside diameter of the head portion. By virtue of the close adaptation of the inside dimensions of the transporting tube to the workpiece dimensions, it is possible to create relatively small radial gap thicknesses between the outer side of the head portion and the pipe inner side. As a result, the head portions of the pressed parts act like pistons in a cylinder. In this way, reliable transport can also be achieved when the pressure difference between the positive pressure side and the negative pressure side of the pressed part is relatively low. Accordingly, in conveyance with compressed air, the compressed-air requirement can be delimited, thereby contributing to conserving resources.

As an alternative or in addition, the transporting pipe may have an inside diameter smaller than the sum of the outside diameter of the head portion and of the shank portion. As a result, it is possible to avoid jamming of pressed parts that follow one another.

Preferably, the transporting pipe forms a transport section which leads from the insertion opening to a discharge opening in a transporting direction, wherein, at a distance downstream of the insertion opening, there is arranged a compressed-gas infeed device, which is designed to introduce compressed gas at a positive pressure into the transporting pipe parallel or at an acute angle to the transporting direction. This makes it possible to have the effect that a negative pressure side results upstream of the compressed-gas infeed device, that is to say in the direction of the insertion opening, while positive pressure prevails downstream of the compressed-gas infeed. The pressed parts inserted into the transporting pipe are thus sucked as far as the compressed-gas infeed device, accelerated as they pass through the compressed-gas infeed device, and downstream of this conveyed by positive pressure. A subsequent station or a further compressed-gas infeed device, for example, may adjoin the discharge opening or the shaped parts may freely leave the conveyor system there.

In this respect, I found that when the distance between the compressed-gas infeed device and the insertion opening of the transport section is neither excessively small nor excessively large. The distance may be dimensioned such that the compressed-gas infeed device is closer to the discharge opening than the insertion opening. Advantageous distances between the insertion opening and the compressed-gas infeed device, for example, may be at least fifty times or at least one hundred times larger than the inside diameter of the transporting pipe. As an alternative or in addition, the distance may amount to at least 750 mm, in particular 1200 mm or more, in particular when the inside diameter is 5 mm to 10 mm.

A relatively large distance between the insertion opening and the compressed-gas infeed device can ensure, among other things, that the insertion opening can be positioned precisely upstream of the ejector system largely independently of the arrangement of the compressed-gas infeed device without the compressed-gas infeed device colliding with parts of the shaping machine that are close to the tool or being in their region of influence. On the other hand, the distance should also not be excessively large to create a sufficiently great suction action on the suction side between the insertion opening and the compressed-gas infeed device.

The section downstream of the compressed-gas infeed device between it and the discharge opening, that is to say on the positive pressure side of the first compressed-gas infeed device following the insertion opening, should not be excessively long since, in my experience, otherwise the risk of "collisions" of pressed parts that follow one another in the pipe and damage possibly caused thereby increases. In other words: when the side with positive pressure is excessively long, the parts can catch in one another, possibly become stuck in one another, and possibly no longer pass through narrower radii in the pipe.

It is possible to integrate more than one compressed-gas infeed device in one conveyor section so that two or more spaced-apart infeed locations are present. A further compressed-gas infeed device may be arranged at the outlet opening to accelerate the pressed parts arriving there in the direction of downstream pipe portions and to contribute to maintaining an order in the conveyor section.

With the aid of a pneumatic conveyor system, it is very easily possible to supply a very wide variety of subsequent stations with positionally oriented pressed parts arriving in time with the machine cycles. For example, one or more of the following listed subsequent stations may be downstream: a control station for quality control of the pressed parts; a thread-rolling station for creating threads on the shank portion by way of thread rollers; a pointing station for shaping the end faces; a hardening station for hardening the formed pressed parts; an automatic assembly machine, e.g. for chain manufacture; a packing station for packing the pressed parts in suitable packaging for further distribution.

A pipe system of the pneumatic conveyor device may contain one or more sorting diverters as required to subdivide the conveyed-in pressed parts into one or more subgroups in accordance with specific criteria in the region of a branch. For example, a sorting diverter may be arranged downstream of a control station in the transporting direction to automatically sort the pressed parts subjected to control into acceptable parts (within the specification) and non-acceptable parts (outside the specification). The pipe system of the pneumatic conveyor system may be combined with other transporting devices, for example, with one or more slides, one or more collecting containers, one or more conveyor belts or the like.

Features that are discussed in conjunction with the method in terms of their mode of operation, among other things, are analogously also present in the system in the form of suitable structural features. This also applies conversely.

Further advantages and aspects will become apparent from the description of examples, which are explained below on the basis of the figures.

Figure 1:
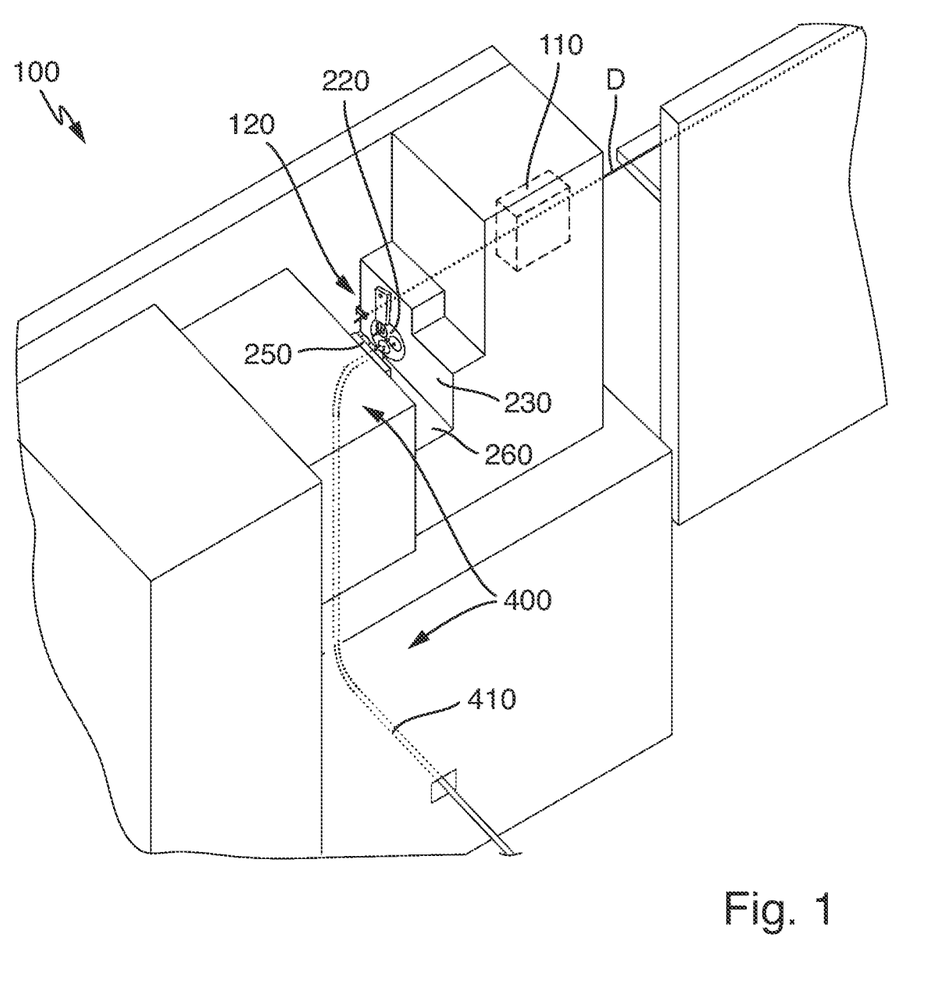
FIG. 1 shows a perspective overview of an example of a system with a wire shaping machine and adjoining pneumatic conveyor system.
Figure 2:
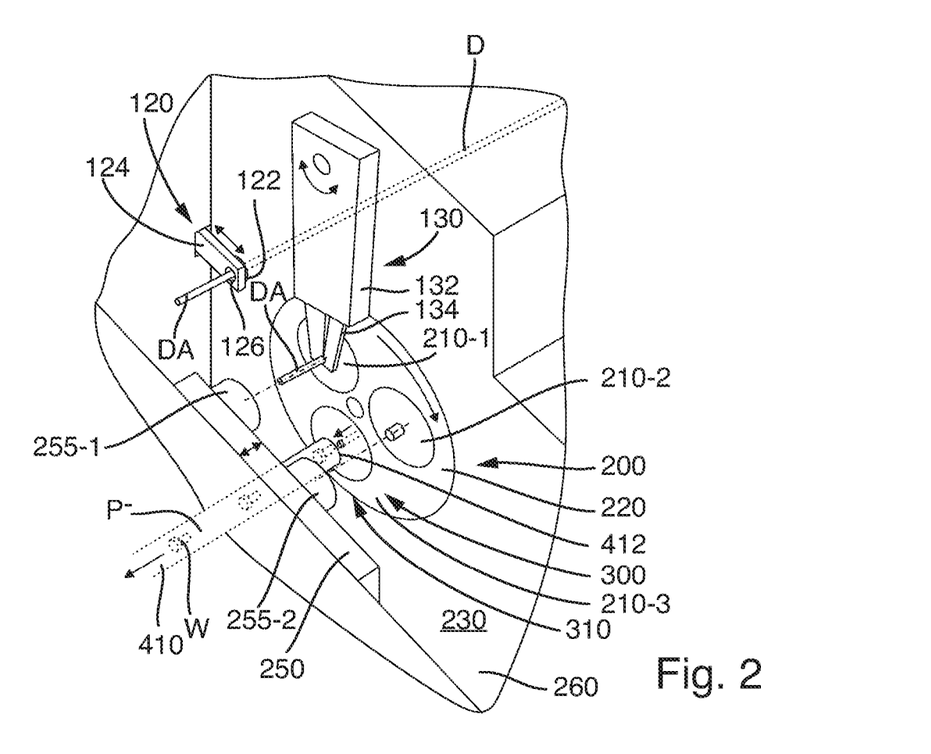
FIG. 2 shows a view of a detail of the work area, equipped with shaping tools, of the shaping machine from FIG. 1.

The perspective overview in FIG. 1 and the view of a detail of the work area or shaping area, equipped with shaping tools, in FIG. 2 show an example of a wire shaping machine 100 that produces shaped parts from wire D. The computer-numerically controlled, multi-axis wire shaping machine has multiple controllable machine axes and a control device for the coordinated actuation of work movements of the machine axes in a manufacturing process in accordance with a computer-readable control program specific to the manufacturing process.

It is possible to produce shaped parts on multi-stage shapers. This can be relatively uneconomical. With ever increasing cost pressure, manufacturers are increasingly making the transfer to manufacturing double-pressure-capable shaped parts on high-performance presses. Double-pressure presses can produce these products with very high yield, relatively low tool costs and relatively short setup times.

The shaping machine 100 in FIG. 1 is a double-pressure shaping press with rotating dies that produce screws, rivets and other shaped parts from wire portions by cold forming. The finished shaped parts are also referred to as pressed parts.

The wire shaping machine 100 has a drawing-in system 110 for drawing in wire D from a wire supply in cycles and conveying the wire to a cutting system 120. Transporting tongs (drawing-in tongs) of the drawing-in system have a clamping jaw which engages on the wire by a force fit and is to be exchanged correspondingly when the wire diameters change. Special holding tongs for holding the wire while the wire is being sheared off are not necessary.

Also provided is a cutting system 120 having a shearing bushing 122 mounted fixedly on the machine and intended for the guiding through of the wire D conveyed by the drawing-in system, and a closed shearing blade 126 fastened to a movably mounted shearing blade carrier 124 and intended for severing wire portions DA from the fed wire in cycles. Moreover provided is a feeder system 130 equipped with a feeder lever 132 and intended for gripping a respective severed wire portion DA and feeding the wire portion into the work area of shaping tools 200 of the wire shaping machine.

The closed shearing blade 126, which is carried by the shearing blade carrier 124 without a dedicated drive, is controlled indirectly via movements of the feeder lever 132. Ejecting the severed wire portion DA is effected by the wire pushing after it in the drawing-in movement, with the result that no special ejector station is required on the cutting system. A taking-up of the severed wire portion DA into uncontrolled gripper tongs 134 and a pivoting movement of the feeder 132 upstream of the shaping die are effected.

The shaping tools 200 comprise three dies 210-1, 210-2, 210-3 in a rotatable or pivotable die holder 220. The die holder 220 is mounted in a die block 230. The dies are held precisely in a work position by cam-controlled locking.

Arranged at an axial distance from the die block is a ram block 250 that carries two stationary rams 255-1, 255-2 which are part of the shaping tools and are arranged facing the top work positions of the dies. The two stationary rams 255-1, 255-2 are applied alternately to the dies during each pressing stroke. Synchronously working ejector systems (on the die side and the ram side) prevent the finished formed part (the compressed part) from remaining suspended in the tools of the respective work positions.

Underneath the top two work stations facing the rams, there is arranged a work station to which no ram is assigned, that is to say at which no shaping takes place. This work station is the ejector station 310 of the ejector system 300 for finished pressed parts. In FIG. 2, the third die 210-3 is arranged on the ejector station. The ejector system has an ejector pin 320 that can be moved back and forth in an axially parallel manner in time with the machine cycles and which presses the fully pressed pressed parts from the machine side respectively out of the die arranged in the ejector station forwards in the direction of the ram block and as a result out of the die.

With the aid of the rotating die holder, three work steps can be carried out simultaneously. With the aid of a pre-compressor, first of all the head portion is preformed. With the aid of the following finishing compressor, full shaping of the head is effected. Lastly, the pressed part W manufactured fully in two pressing stages is ejected at the ejector station with the aid of the ejector pin.

The machine lubrication and separate tool lubrication ensure oil circuits that are largely free of intermingling by virtue of the encapsulation of assemblies. A maintenance-free toothed belt provides the synchronous driving of all auxiliary drives. All the movable parts are secured by fixedly screwed protective coverings. Movable protective coverings provide easy access to the protected components.

An interspace 260 runs perpendicularly with respect to the axis of rotation of the die block between the die block 230 and the ram block 250. In conventional double-pressure shaping machines, a conveyor belt or a slide that collects pressed parts ejected from the ejector system and transports them away to the side, of a transporting system runs in the bottom region of the interspace. Machine oil residues that could wet the pressed parts generally also collect there.

Figure 3:
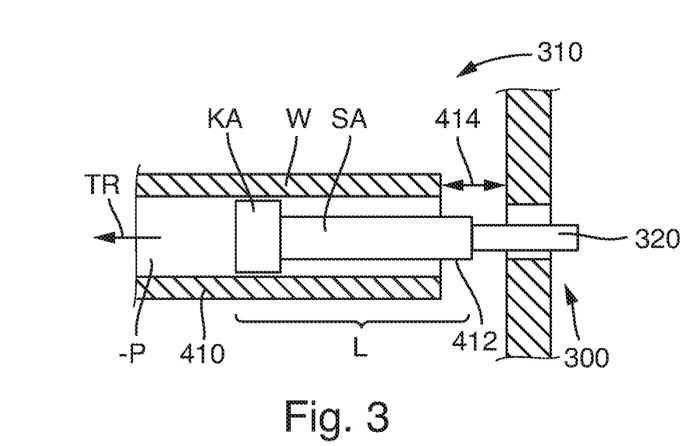
FIG. 3 shows a transfer area between the ejector system and the transporting pipe of the conveyor system.

As a departure, the manufacturing system equipped with the double-pressure shaping machine 100 and produces shaped parts from wire is equipped with a pneumatic conveyor system 400 for the controlled transport away of finished shaped parts. The conveyor system is part of the manufacturing system and comprises a smooth-walled, metallic transporting pipe 410, e.g., of stainless steel having an insertion opening 412 for successively receiving finished shaped parts. FIG. 3 shows a transfer area between the ejector system 300 and the transporting pipe 410 of the conveyor system 400. As can be seen in FIGS. 2 and 3, that portion of the transporting pipe 410 that directly adjoins the insertion opening 412 extends parallel to the main axis of the shaping machine (axis of rotation of the die holder 220). The insertion opening is arranged on the ejecting station 310 in the direct vicinity of the machine-side components of the ejector system and coaxially with respect to the longitudinal centre axis of the ejector pin 320. The axial distance 414 between the insertion opening and the end face facing it of the die respectively arranged in the ejector station is dimensioned in this example such that it is not significantly larger than the projection with which a finished pressed part protrudes beyond the end face of the die after the pressed part has been fully pressed. The distance may be of the order of magnitude of 10 to 50 mm, for example. As a result, the insertion opening 412 is mounted close to the ejector system such that the finished shaped parts can be pushed directly into the insertion opening with the aid of the ejector system, in particular with the aid of the ejector pin 320. The ejector pin is preferably in touching contact with the shank-side end at least until at least the head portion has been pushed completely into the interior of the transporting pipe. In this respect, the pressed parts do not have the option of changing their spatial orientation or their position after exiting the die and entering the insertion opening so that the pressed parts can be pushed directly and in a positionally oriented manner into the insertion opening 412.

As will be explained in more detail below, the pneumatic conveyor system 400 is designed such that a negative pressure (symbol: −p) prevails in comparison with ambient pressure in the region of the insertion opening 412, and therefore the pressed parts are sucked into the transporting pipe in time with the machine cycles. The further transport proceeds initially by negative pressure along the transport section specified by the orientation of the transporting pipe, in the direction of at least one subsequent station.

Figure 4:
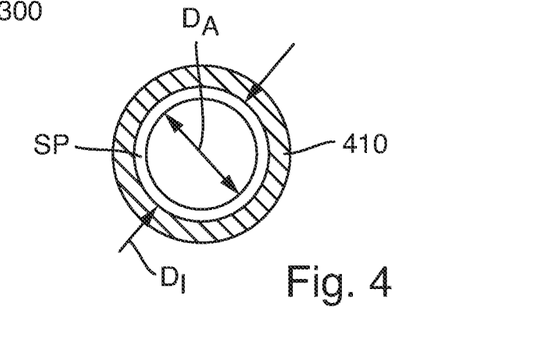
FIG. 4 shows a section through the transporting pipe with a pressed part received therein.

The transporting pipe 410 is a workpiece-adapted component of the conveyor system 400. In the example, double pressure is used to produce pressed parts W that are rotationally symmetrical with respect to a workpiece longitudinal axis and at one of their ends have a head portion KA created by multi-stage pressing and is widened on all sides with respect to a shank portion SA formed in one piece with it. The head portion KA of the workpiece has a substantially cylindrical form and has an outside diameter $D_A$ (cf. FIG. 4). The transporting pipe 410 has an inside diameter $D_I$ adapted to the workpiece geometry and is only a few percent larger than an outside diameter of the head portion, e.g., not more than 25% larger or not more than 20% larger. The inside diameter should not be larger than the sum of the diameter of the head portion and the shank portion, which makes it possible to avoid wedging of pressed parts that run one behind another. Only a relatively small annular gap SP, the radial extent of which is, for example, of the order of magnitude of 1 mm or 2 mm and/or can be 10% to 20% of the outside diameter of the head portion, preferably remains between the edge of the head portion KA and the tube inner wall. The pressed parts W therefore act like a piston in a cylinder. As a result, a relatively small negative pressure in the transporting pipe is enough to create the transporting movement in the transporting direction TR.

Figure 5:
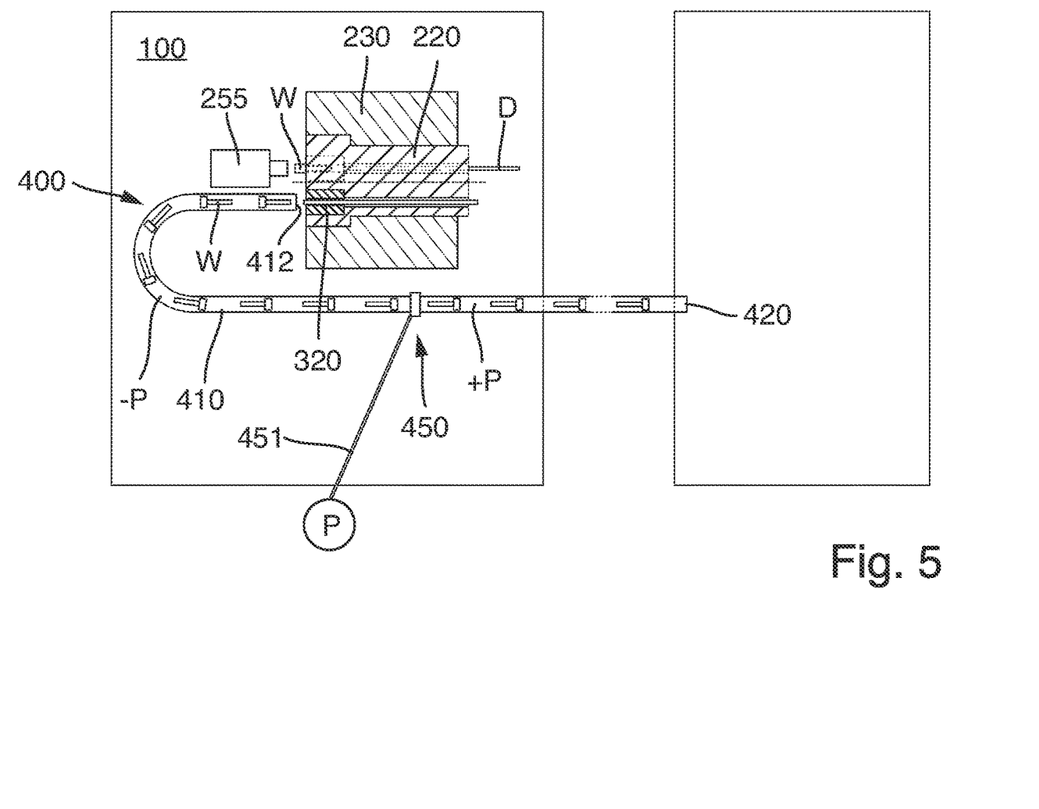
FIG. 5 shows a schematic side view of a system with a shaping machine and assigned pneumatic conveyor system.
Figure 6:
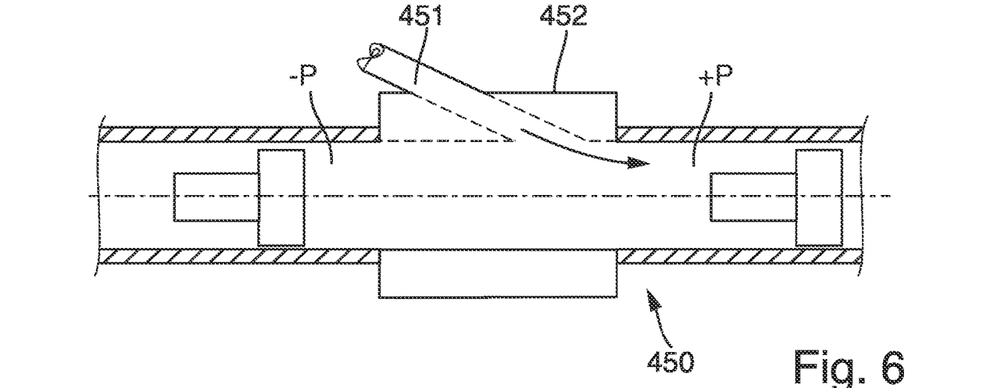
FIG. 6 shows a schematic longitudinal section through a compressed-gas feed device of the conveyor system.

To obtain the suction action in the region of the insertion opening 412 of the transporting pipe 410, in the conveyor system 400 with a relatively large distance from the insertion opening, a compressed-gas infeed device 450 is provided that can be readily seen primarily in FIG. 6. The compressed-gas infeed device comprises a feed pipe 451 connected to a compressed-gas source (for example, pump P in FIG. 5) via a compressed-gas line. The compressed-gas source provides compressed air at positive pressure and pumps it in the direction of the compressed-gas infeed device. The feed pipe 451 runs at an acute angle (e.g., 10° bis 30°) obliquely with respect to the longitudinal direction of the transporting pipe and in the region of a mouth opening 452 leads into the compressed-gas infeed device, the inside diameter of which otherwise corresponds to that of the transporting pipe and forms a stepless, smooth-walled transporting channel therewith. The mouth opening 452 is small enough to rule out the head portion becoming caught at this point.

The compressed gas flowing in through the mouth opening is conducted such that the compressed air at positive pressure is introduced into the transporting pipe 410 more or less parallel or at an acute angle to the transporting direction. This results in a positive pressure side (+p) downstream of the compressed-gas infeed device (on the right in FIG. 6). By contrast, on the feed side leading in the direction of the mouth opening, the negative pressure (−p) is produced, which prevails throughout the transporting pipe between the compressed-air infeed device and the insertion opening and ensures that the pressed parts are sucked into the insertion opening 412.

The compressed-air nozzle or compressed-gas infeed device 450 attached in the middle region of the transporting pipe between the inlet opening 412 and an outlet opening 420 thus creates a negative pressure on the pipe inlet side, but a positive pressure on the pipe outlet side. As a result, the shaped parts are sucked up on the pipe inlet side and accelerated considerably as they pass through by the compressed-gas infeed device. In this respect, the shaped parts act as a sort of piston in a cylinder formed by the transporting pipe, as a result of which the negative pressure on the pipe inlet side is intensified even more considerably. The flow velocity within the transporting pipe is thus increased by the pressed parts themselves. With the aid of this system, the compressed air used can be considerably reduced, and thus savings on further resources can be made.

Figure 7:
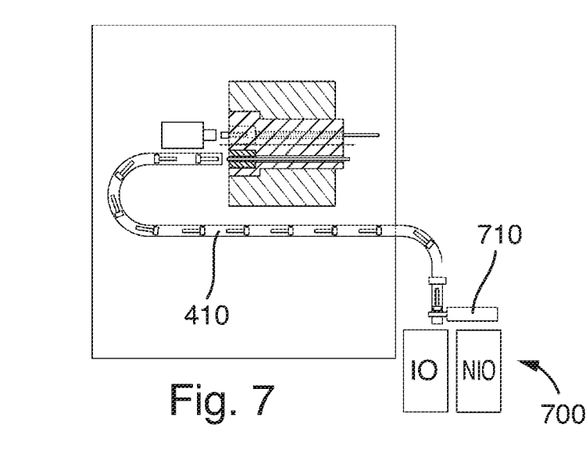
FIGS. 7 to 9 show examples of subsequent stations which can be charged by the conveyor system.
Figure 8:
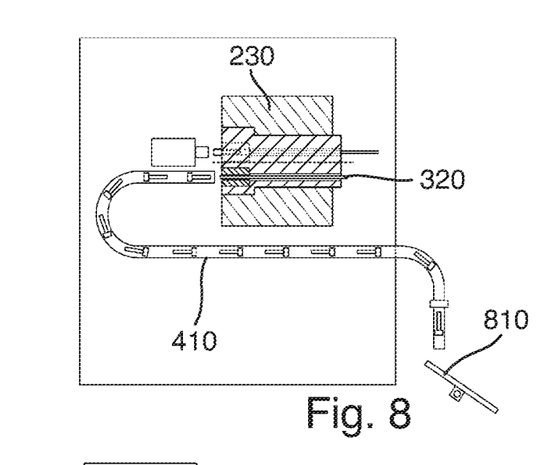
Figure 9:
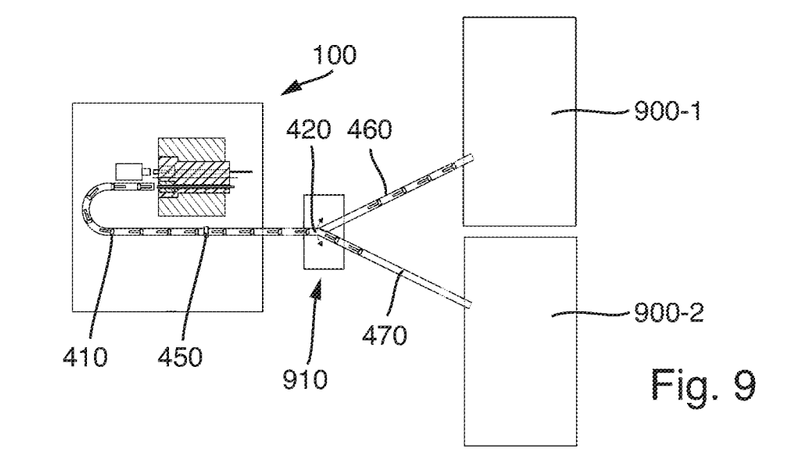

With reference to FIGS. 7, 8 and 9, by way of example, some possible subsequent steps for further processing the pressed parts on the outlet side of the transporting pipe will be explained. In FIG. 7, the compressed-gas infeed device is located in the vicinity of the outlet side of the transporting pipe above collecting containers 700 for the pressed parts. An upstream sorting device 710 checks the finished pressed parts to maintain the tolerances, and therefore the pressed parts can be subdivided into separate containers for acceptable parts (IO) and non-acceptable parts (NIO).

In FIG. 8, a slide or a sorting diverter 810 is provided for sorting the pressed parts instead of the sorting device.

FIG. 9 schematically shows a larger manufacturing installation or a manufacturing system in which the double-pressure shaping machine 100 is integrated. A distributor system 910, which sorts the arriving pressed parts into, for example, two discharging branches 460, 470 with transporting pipes in accordance with specific criteria, is located at the outlet end or at the outlet opening 420 of the transporting pipe 410. In the example, the continuing transport sections lead to two schematically illustrated machines 900-1, 900-2, which by way of example stand for any desired downstream process steps or manufacturing steps. Distribution to different processes or (if the part output of the downstream process is lower) division over multiple machines of one process step is possible.

Figure 10:
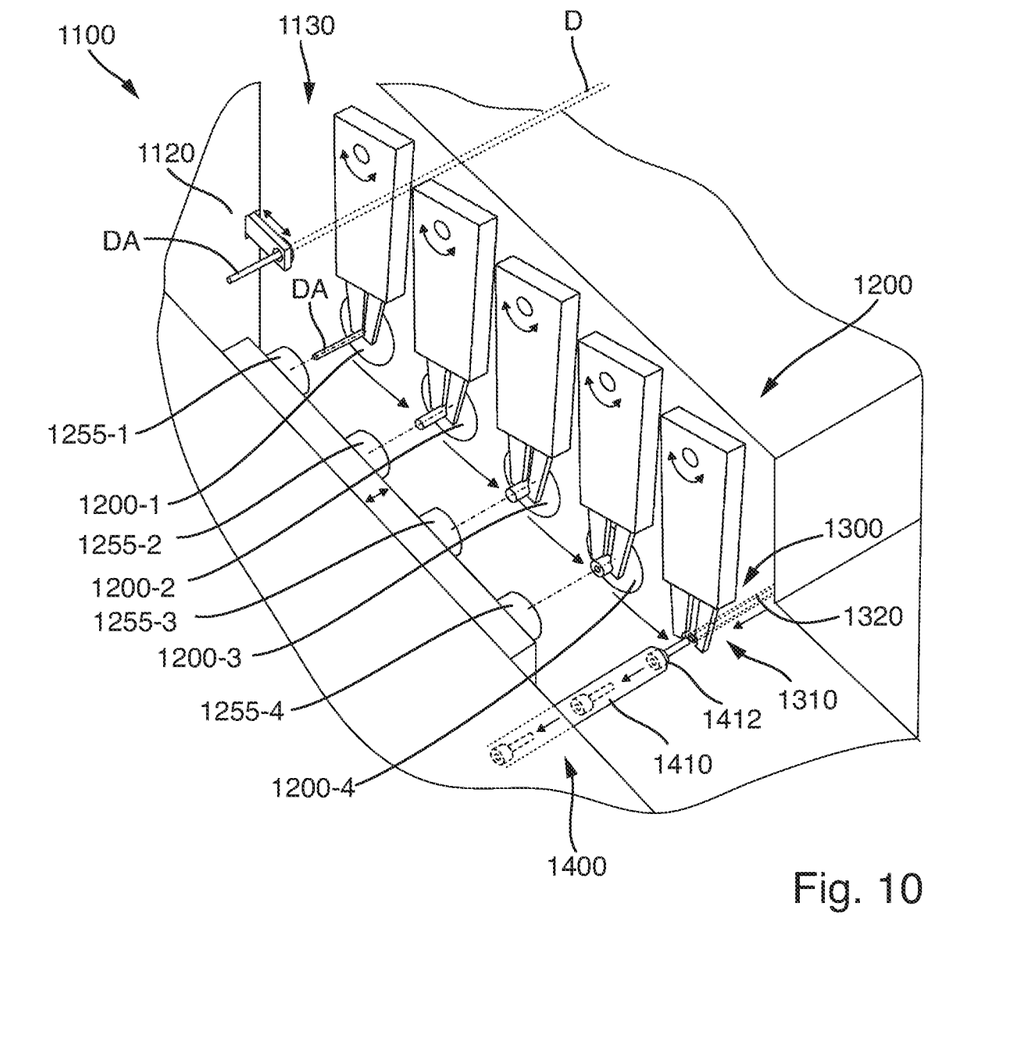
FIG. 10 shows an example of a multi-stage press designed for four shaping stages and having an adjoining pneumatic conveyor system.

Some aspects have been explained using the example of a system with a double-pressure shaping press 100. My methods and systems can also be utilized in other wire shaping machines, e.g., multi-stage presses. For illustration purposes, FIG. 10 shows an oblique perspective view of a work area, equipped with shaping tools, of a multi-stage press 1100 designed for four shaping stages. For reasons of clarity, features that are similar or the same in terms of function and/or structure to corresponding features of the double-pressure shaping press 100 are denoted by the same reference signs increased by 1000.

The shaping tools 1200 comprise four dies 1200-1 to 1200-4 arranged horizontally next to one another in a row and are mounted in a die block. A pivotable gripper is assigned to each die. That gripper arranged directly next to the cutting system 1120 is part of the feeder system 1130, which brings the wire portion DA severed from the fed wire D into the first die 1200-1. The other gripping levers pivot in a coordinated manner with this first gripper and transport the wire portion in succession from the first die, via the second and the third die, to the fourth die 1200-4. Between each of the transport phases, the rams 1255-1 to 1255-4 facing the dies are moved in the direction of the die block and thereby compress the workpiece in a total of four stages. The pressed part W fully compressed in the four dies 1200-4 is then gripped by a fifth pivotable gripper and moved horizontally into an ejector position of the ejector system 1300. The ejector system comprises an ejector pin 1320 that can be moved back and forth horizontally in time with the machine cycles and, in an advancing stroke, can push a finished workpiece held by the tongs forwards in the direction of the ram block.

Analogously to the other example, the insertion opening 1412 of a transporting pipe 1410 of the pneumatic conveying system 1400 is arranged in the region of the ejector station. Transfer of the finished pressed parts is effected analogously to the above-described double-pressure shaping press, which is why reference is made to the description given above. In terms of the transporting system, the same statements as for the example given above apply.

The invention claimed is:

1. A method of producing shaped parts from wire by a multi-stage press that produces shaped parts from wire portions, comprising:
    drawing in the wire from a wire supply in cycles and conveying the wire to a cutting system;
    severing wire portions from the fed wire in cycles by the cutting system;
    gripping a respective severed wire portion and feeding the wire portion into the work area of shaping tools;
    shaping the wire portion in multiple stages to form a shaped part with a shank portion and a head portion widened with respect to the shank portion by the shaping tools;
    ejecting the fully formed shaped parts in cycles by an ejector system;
    transporting the fully formed shaped parts with a pneumatic conveyor system comprising a transporting pipe with an insertion opening for successively receiving finished shaped parts by:
    arranging the insertion opening in the vicinity of the ejector system such that the finished shaped parts can be inserted into the insertion opening directly in a positionally oriented manner by the ejector system;
    successively feeding the finished shaped parts into the transporting pipe by the ejector system during the manufacturing operation;
    taking up the shaped parts inserted into the transporting pipe by suction into the transporting pipe; and
    pneumatically transporting the sucked-on shaped parts through the transporting pipe in a direction of a subsequent station.

2. The method according to claim 1, wherein the ejector system has an ejector pin that can be moved back and forth in time with the machine cycles, which ejector pin displaces fully pressed shaped parts respectively out of a die arranged in the ejector station or out of a gripper in the direction of the transporting pipe, and the insertion opening is mounted close to the ejector system such that the finished shaped parts are pushed directly into the insertion opening with the aid of the ejector pin.

3. The method according to claim 1, wherein a transporting pipe adapted to dimensions of the shaped part is used, and one or more of (i)-(iii) apply:
    the transporting pipe has an inside diameter smaller than a length of the shaped parts;
    (ii) the transporting pipe has an inside diameter at most 20% larger than the outside diameter of the head portion; and
    (iii) the transporting pipe has an inside diameter smaller than the sum of the outside diameter of the head portion and the shank portion.

4. The method according to claim 1, wherein the transporting pipe forms a transport section leading from the insertion opening to a discharge opening in a transporting direction, and, at a distance downstream of the insertion opening, there is arranged a compressed-gas infeed device that introduces compressed gas at a positive pressure into the transporting pipe parallel or at an acute angle to the transporting direction.

5. The method according to claim 4, wherein the distance is dimensioned such that one or more of (i)-(iv) apply:
    the compressed-gas infeed device is closer to the discharge opening than the insertion opening;
    (ii) the distance is 50% to 90% of a length between the insertion opening and the discharge opening;
    (iii) the distance amounts to at least 750 mm;
    (iv) the distance is at least 50 times greater than the inside diameter of the transporting pipe.

6. The method according to claim 1, wherein, to produce the shaped parts, a multi-stage press in the form of a double-pressure shaping press with rotating dies is used.

7. A system that produces shaped parts from wire that produces shaped parts from wire portions, having at least one multi-stage press comprising:
    a drawing-in system that draws in wire from a wire supply in cycles and conveys the wire to a cutting system;
    a cutting system that severs wire portions from the fed wire in cycles;
    a feeder system that grips a respective severed wire portion and feeds the wire portion into the work area of shaping tools of the wire shaping machine;
    multiple shaping stations with shaping tools that shape the wire portion in multiple stages to form a shaped part with a shank portion and a head portion that is widened with respect to the shank portion;
    an ejector system that ejects the fully formed shaped parts in cycles, comprising:
    a pneumatic conveyor system that transports finished shaped parts out of the work area comprising a transporting pipe with an insertion opening that successively receives finished shaped parts;
    the insertion opening is arranged in the vicinity of the ejector system such that the finished shaped parts can be inserted into the insertion opening directly in a positionally oriented manner by the ejector system;
    the ejector system configured, during the manufacturing operation, to insert finished shaped parts for take-up by the conveyor system at least partially into the transporting pipe through the insertion opening in cycles; and
    the conveyor system is configured to suck up the shaped part taken up by the ejector system in the region of the inlet opening and pneumatically convey it through the transporting pipe in the direction of a subsequent station.

8. The system according to claim 7, wherein the ejector system has an ejector pin that can be moved back and forth in time with the machine cycles, which ejector pin is configured to displace fully pressed shaped parts respectively out of a die arranged in an ejector station in the direction of the transporting pipe, and the insertion opening is mounted close to the ejector system such that the finished shaped parts are pushed directly into the insertion opening with the aid of the ejector pin.

9. The system according to claim 7, wherein the transporting pipe is adapted to dimensions of the shaped part such that one or more of (i)-(iii) apply:
the transporting pipe has an inside diameter smaller than a length of the shaped parts;
(ii) the transporting pipe has an inside diameter which is at most 20% larger than the outside diameter of the head portion; and
(iii) the transporting pipe has an inside diameter smaller than the sum of the outside diameter of the head portion and the shank portion.

10. The system according to claim 7, wherein the transporting pipe forms a transport section that leads from the insertion opening to a discharge opening in a transporting direction, and, at a distance downstream of the insertion opening, there is arranged a compressed-gas infeed device that introduces compressed gas at a positive pressure into the transporting pipe parallel or at an acute angle to the transporting direction.

11. The system according to claim 10, wherein the distance is dimensioned such that one or more of (i)-(iv) apply:
the compressed-gas infeed device is closer to the discharge opening than the insertion opening;
(ii) the distance is 50% to 90% of the length between the insertion opening and the discharge opening;
(iii) the distance amounts to at least 750 mm; and
(iv) the distance is at least 50 times greater than the inside diameter of the transporting pipe.

12. The system according to claim 7, wherein, to produce the shaped parts, a multi-stage press in the form of a double-pressure shaping press with rotating dies is used.

13. The system according to claim 7, wherein one or more of (i)-(vi) subsequent stations is downstream of the conveyor system:
a control station for quality control of the pressed parts;
(ii) a thread-rolling station that creates threads on the shank portion by way of thread rollers;
(iii) a pointing station that shapes the end faces;
(iv) a hardening station that hardens the formed pressed parts;
(v) an automatic assembly machine; and
(vi) a packing station that packs the pressed parts in packaging for further distribution.

* * * * *